(12) United States Patent
Schlup, Jr.

(10) Patent No.: US 7,568,732 B2
(45) Date of Patent: Aug. 4, 2009

(54) FOLDING ROLL-OVER PROTECTIVE STRUCTURE

(75) Inventor: Kenneth G. Schlup, Jr., Newton, KS (US)

(73) Assignee: Full Vision, Inc., Newton, KS (US)

( * ) Notice: Subject to any disclaimer, the term of this patent is extended or adjusted under 35 U.S.C. 154(b) by 500 days.

(21) Appl. No.: 11/380,998

(22) Filed: May 1, 2006

(65) Prior Publication Data
US 2007/0252371 A1 Nov. 1, 2007

(51) Int. Cl.
*B60R 21/13* (2006.01)
*B62D 49/00* (2006.01)
(52) U.S. Cl. .......................... 280/756; 16/232
(58) Field of Classification Search ............... 280/756; 211/22, 100, 104, 105.1; 108/44; 16/374, 16/221, 232, 235, 249, 277; 296/107.17, 296/108, 109, 121, 109.3, 107.9, 107.11, 296/107.16

See application file for complete search history.

(56) References Cited

U.S. PATENT DOCUMENTS

| | | | | |
|---|---|---|---|---|
| 3,904,225 A | * | 9/1975 | George et al. | 280/478.1 |
| 4,949,991 A | * | 8/1990 | Ludwig | 280/756 |
| 5,503,430 A | * | 4/1996 | Miki et al. | 280/756 |
| 5,779,272 A | * | 7/1998 | Panek et al. | 280/756 |
| 5,839,758 A | * | 11/1998 | Finch et al. | 280/756 |
| 5,970,540 A | * | 10/1999 | Cheng | 5/99.1 |
| 5,975,620 A | * | 11/1999 | Jambor et al. | 296/108 |
| 6,557,922 B1 | * | 5/2003 | Hommel | 296/107.17 |
| 7,003,849 B2 | * | 2/2006 | Cohen et al. | 16/232 |
| 7,131,166 B2 | * | 11/2006 | Cohen et al. | 16/232 |
| 7,222,882 B2 | * | 5/2007 | Boucher | 280/756 |
| 2005/0073140 A1 | * | 4/2005 | Boucher | 280/756 |
| 2005/0091792 A1 | * | 5/2005 | Cohen et al. | 16/232 |
| 2005/0212278 A1 | * | 9/2005 | Kurten et al. | 280/756 |
| 2005/0268430 A1 | * | 12/2005 | Cohen et al. | 16/221 |
| 2007/0182147 A1 | * | 8/2007 | Cooper et al. | 280/756 |
| 2007/0252371 A1 | * | 11/2007 | Schlup, Jr. | 280/756 |
| 2007/0290493 A1 | * | 12/2007 | David | 280/756 |
| 2008/0217897 A1 | * | 9/2008 | Latussek | 280/756 |

OTHER PUBLICATIONS

Notification Concerning Transmittal of Copy of International Preliminary Report on Patentability regarding International Application No. PCT/US2006/040590 (1page), Dec. 8, 2008.

International Preliminary Report on Patentability regarding International Application No. PCT/US2006/040590 (1 page), Oct. 13, 2006.

(Continued)

*Primary Examiner*—Glenn Dayoan
*Assistant Examiner*—Karen Amores
(74) *Attorney, Agent, or Firm*—Hovey Williams LLP (57) ABSTRACT

A folding roll-over protective structure has hinges that may be attached weld-free to the folding legs of the structure. Selectively removable locking pins may be used to lock the structure in its fully upright use position or a collapsed folded position. Strategically located cushions within the hinges take up slack in the system to minimize rattling when the structure is locked in its use position.

34 Claims, 7 Drawing Sheets

OTHER PUBLICATIONS

Written Opinion of the International Searching Authority regarding International Application No. PCT/US2006/040590 (4 pages).
Parts Drawing—Mahindra 2310/2810—ROPS Model 218-07100 (1 pg).
Parts Drawing—Lastec Model 377-07020 (1 pg).
Parts Drawing—MTD Cub Cadet 5000 Series—Upper ROPS Folding Version—Full Vision Model No. 368-07070 (1 pg).
Parts Drawing—Bad Boy—ROPS Model 375-07010 (1 pg).

* cited by examiner

FOLDING ROLL-OVER PROTECTIVE STRUCTURE

TECHNICAL FIELD

This invention relates to folding roll-over protective structures of the type frequently used in connection with motorized riding vehicles such as lawnmowers, utility vehicles and tractors. More particularly, it relates to improvements in the hinge assemblies of such foldable structures.

BACKGROUND AND SUMMARY

Folding roll-over protective structures are well-known in the art. Such structures are available in a wide variety of shapes and sizes and are adapted to fit many different types and brands of vehicles. Likewise, the hinge arrangements for the various structures vary widely in details of construction and methods of assembly. However, one common characteristic of all conventional commercially available folding protective structures is that a significant amount of welding exists in and around the hinge assemblies of such structures. Welding is not only labor intensive, it also yields a product that may be unsightly and prone to failure if poorly fabricated.

The present invention provides a folding roll-over protective structure having a hinge system that is a dramatic improvement over the prior art. In a most preferred form of the invention, the hinge assembly for each leg of the roll-over structure can be incorporated entirely weld-free into the leg without sacrificing strength, reliability or cost. Indeed, one advantage of such a design is the significant labor savings achievable by eliminating, or at least significantly reducing, the amount of welding operations involved. Further, a system in accordance with the present invention has a neat, clean, well-engineered appearance compared to prior constructions.

DETAILED DESCRIPTION

The present invention is susceptible of embodiment in many different forms. While the drawings illustrate and the specification describes certain preferred embodiments of the invention, it is to be understood that such disclosure is by way of example only. There is no intent to limit the principles of the present invention to the particular disclosed embodiments.

Figures 1, 2:
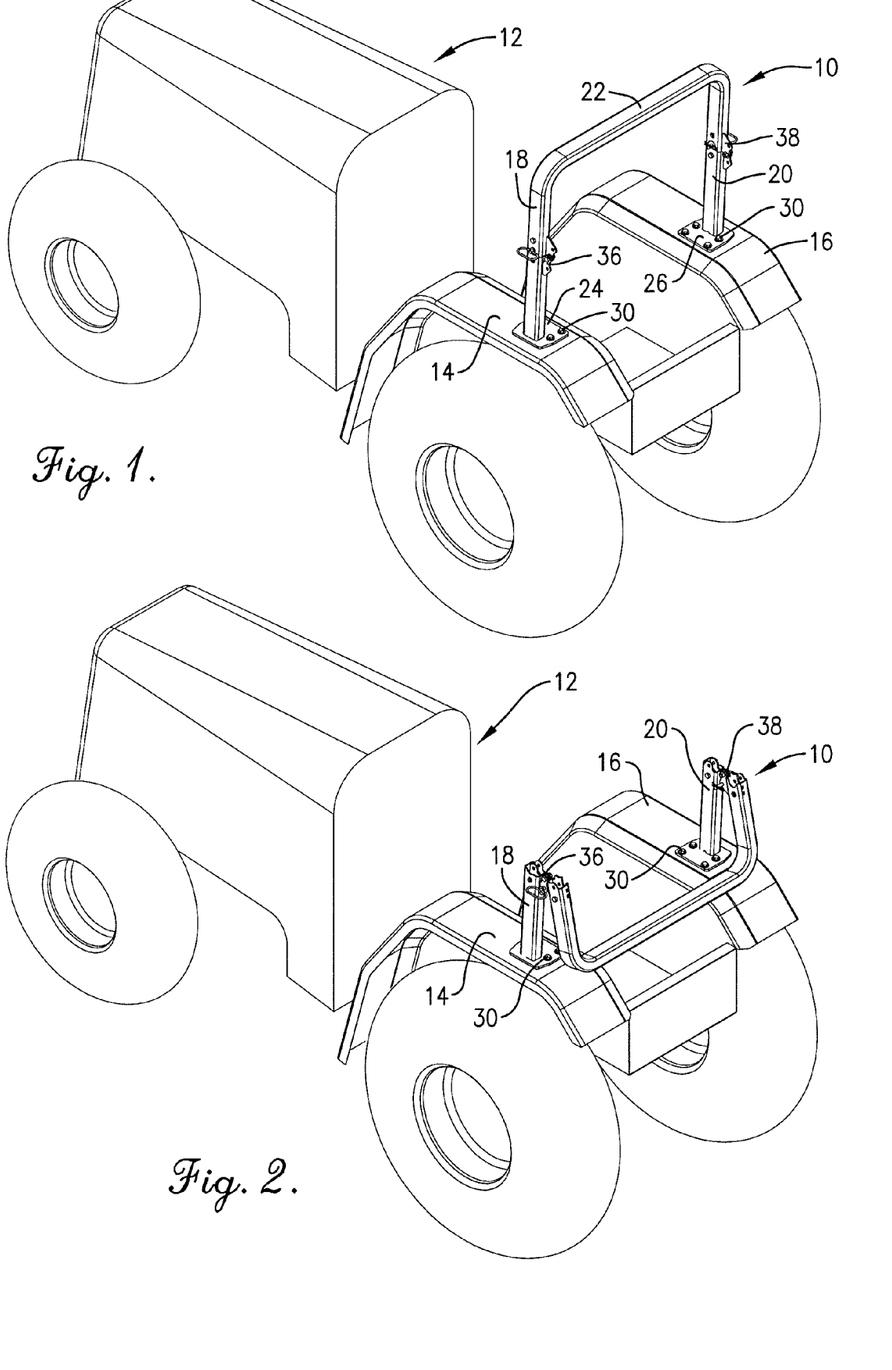
FIG. 1 is a schematic illustration of a motorized riding vehicle having a folding roll-over protective structure in accordance with the principles of the present invention, the roll-over structure being illustrated in its fully upstanding, use position.
FIG. 2 is an illustration similar to FIG. 1 but showing the roll-over protective structure collapsed into a folded position.

FIGS. 1 and 2 show a roll-over protective structure 10 in accordance with the present invention installed on a motorized riding vehicle 12 that is schematically illustrated as comprising a garden tractor. As will be apparent, structure 10 is suitable for use with a wide variety of vehicle types, and the illustration in FIGS. 1 and 2 of a garden tractor is not to be taken in a limiting sense, but rather as only one example of numerous vehicles with which structure 10 might be used. Moreover, in FIGS. 1 and 2, structure 10 is illustrated as being mounted on fenders 14 and 16 of vehicle 12. However, it will be appreciated that structure 10 could be attached to its vehicle at a number of different locations utilizing a variety of different attaching means. FIG. 1 illustrates the structure 10 in its upright use position, while FIG. 2 shows structure 10 in a folded position.

Figures 3, 4:
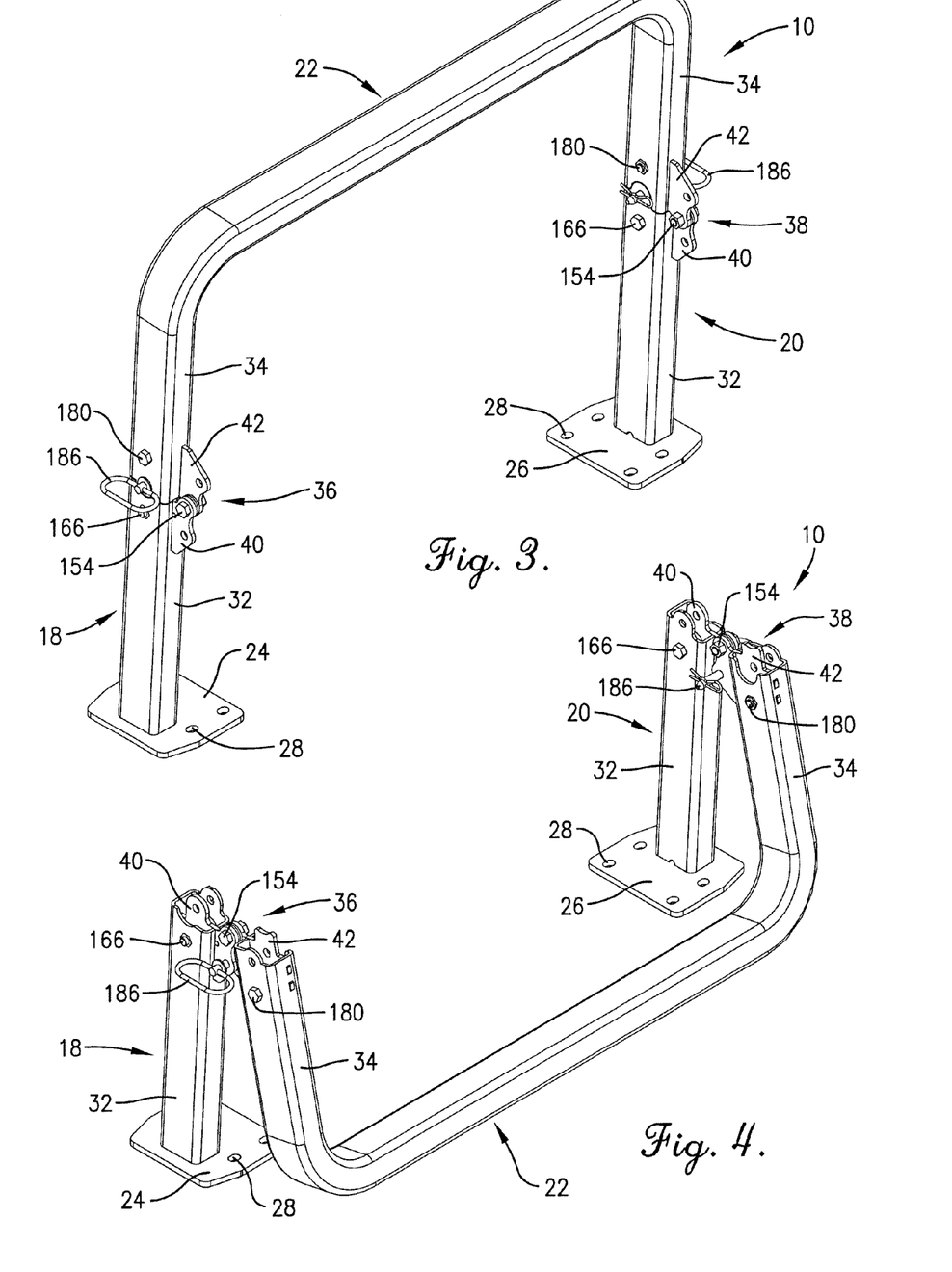
FIG. 3 is an enlarged, rear isometric view of the roll-over protective structure locked in its use position.
FIG. 4 is a rear isometric view of the roll-over protective structure locked in its folded position.
Figure 5:
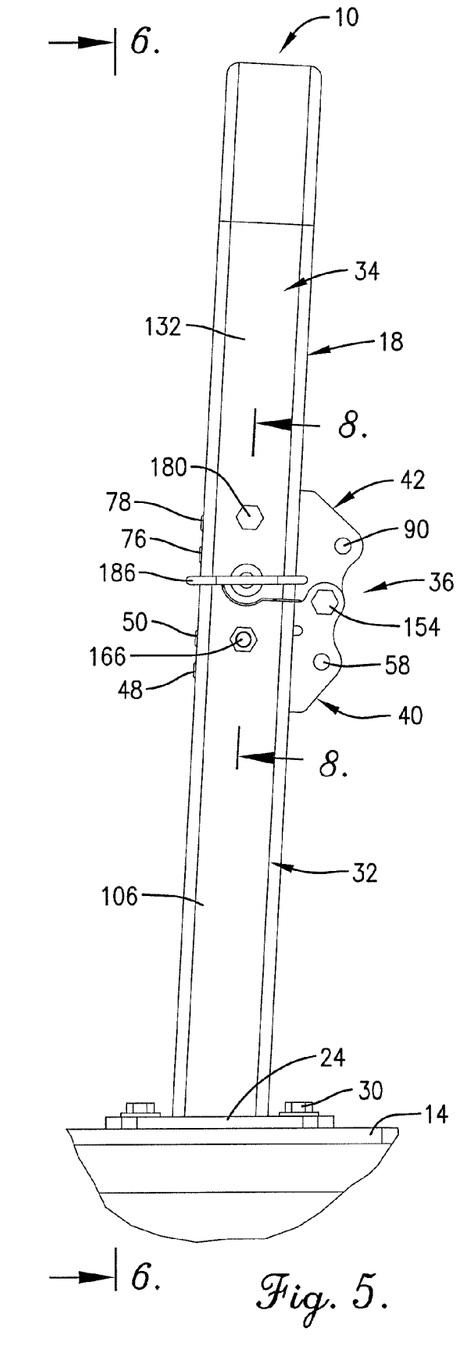
FIG. 5 is a fragmentary left side elevational view of the roll-over structure locked in its use position.
Figure 6:
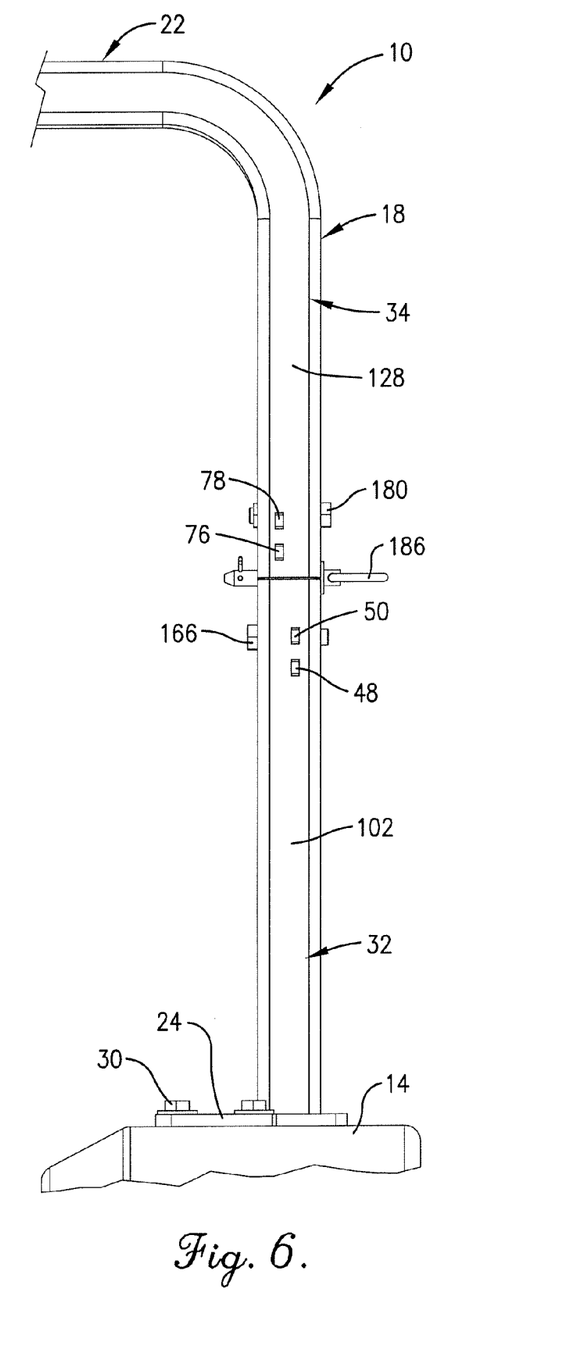
FIG. 6 is a fragmentary front elevational view of the left leg of the structure taken substantially along sight line 6-6 of FIG. 5.

FIGS. 3 and 4 illustrate structure 10 in isolation, detached from vehicle 12. Broadly speaking, structure 10 is generally of an inverted, U-shaped configuration, having a pair of upright legs 18 and 20 that are integrally joined across their upper ends by a transverse member 22. In the particular illustrated embodiment, structure 10 has a pair of horizontally disposed mounting plates 24 and 26 fixed to the lower ends of legs 18 and 20, respectively, for attaching structure 10 to the selected vehicle. Holes 28 in plates 24, 26 receive bolts 30 (FIGS. 1 and 2) for securing structure 10 in place.

In a preferred embodiment, structure 10 is constructed from tubular material, preferably steel, that has been formed into the desired shape. In the illustrated embodiment, the tubing from which structure 10 is constructed has a rectangular transverse cross-section, although it is to be understood that the principles of the present invention are not limited to any particular cross-sectional shape for structure 10. Indeed, the tubing may, for example, have a square, oblong, obround, circular, elliptical or even triangular configuration. Furthermore, while structure 10 has been illustrated as a simple inverted U design, it is to be understood, as well understood by those skilled in the art, that the overall shape of structure 10 could vary significantly without departing from the principles of the present invention. For example, structure 10 could be incorporated into and combined with a falling object protective structure, in which event structure 10 would be provided with forwardly projecting canopy structure and the like providing protection for the operator from falling overhead objects. In some instances, it is desirable for the structure 10 to be oriented at more of an inclined angle then that illustrated in the figures.

Each leg 18, 20 includes a lower leg portion 32 and an upper leg portion 34. A pair of hinge assemblies 36 and 38 for legs 18 and 20 respectively are connected to lower and upper leg portions 32, 34 in such a manner as to permit the top half of structure 10 to be folded from a use position of FIG. 3 to a folded position of FIG. 4. Each hinge assembly 36, 38 includes a pair of flat, specially configured hinge plates 40 and 42 that are pivotally connected together in side-by-side relationship for relative pivotal movement about a transverse axis normal to the plane of the plates. In a most preferred embodiment, hinge plates 40, 42 are designed to permit secure fastening thereof to structure 10 without welds of any kind. While being weld-free is not necessarily a required feature of the present invention, it will be appreciated that the system as herein disclosed lends itself to a totally weldless construction. Of course, those skilled in the art will appreciate that welds could be provided at selected locations without departing from the principles of the present invention.

Figure 13:
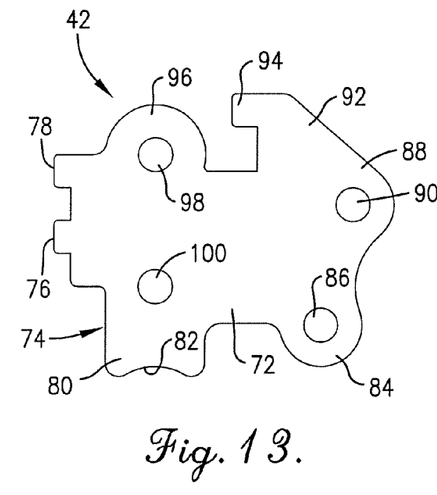
FIG. 13 is a plan view of the upper hinge plate of one of the hinge assemblies of the roll-over structure.
Figure 14:
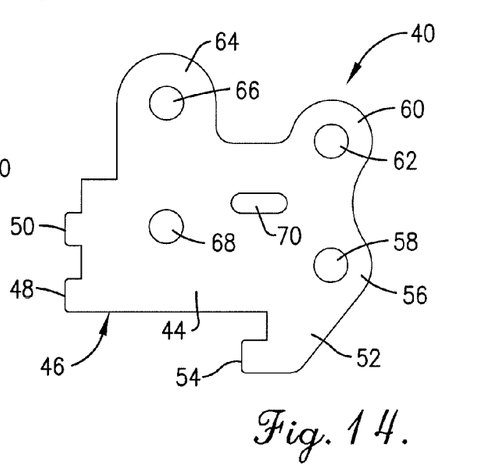
FIG. 14 is a plan view of the lower hinge plate of one of the hinge assemblies of the roll-over structure.

FIGS. 13 and 14 illustrate the individual hinge plates in isolation. Dealing first with the lower hinge plate 40 in FIG. 14, it will be seen that the hinge plate comprises a flat, planar body 44 having a continuous, but irregular, peripheral edge 46. A front portion of edge 46 is configured to present a pair of locating projections 48, 50 in the form of rectangular tabs. Near the rear of body 44, a tang 52 juts downwardly and forwardly, and edge 46 is configured to present a third forwardly extending projection 54, also in the nature of a rectangular tab. Tab 54 is disposed below the level of the lower front tab 48 and is spaced considerably rearwardly therefrom.

At the rear of body 44, edge 46 projects outwardly and rearwardly to present a hump 56. A transverse locking hole 58 is disposed within hump 56 for a purpose as hereinafter explained in more detail. At the upper rear corner of body 44, edge 46 is configured to present a rounded ear 60 having a transverse pivot hole 62 therethrough. Adjacent the upper front corner of body 44, edge 46 is configured to present an upwardly projecting, rounded lug 64 having a transverse locking hole 66 therethrough. The front central portion of body 44 has a transverse mounting hole 68 therethrough, while the rear central portion of body 44 has an elongated clearance hole 70 for a purpose as hereinafter explained.

Like lower hinge plate 40, upper hinge plate 42 comprises a flat, planar body 72 having a continuous but irregular peripheral edge 74. In its front portion, edge 74 is configured to present a pair of forwardly extending projections 76 and 78 in the nature of rectangular tabs. In its lower front corner, body 72 is provided with a downwardly projecting foot 80 wherein edge 74 is configured to provide a concave seat 82 for a purpose yet-to-be-described. At the lower rear corner of body 72, edge 74 is configured to present a rounded ear 84 having a transverse locking hole 86 therethrough. Adjacent the upper rear corner of body 72, edge 74 is configured to present an outwardly and rearwardly projecting lug 88 having a transverse pivot hole 90 therethrough.

Body 72 has an upwardly and forwardly projecting extension 92 adjacent the upper rear corner thereof, with the peripheral edge 74 in that region being configured to present a forwardly extending projection 94 in the nature of a rectangular tab. A rounded, upwardly projecting lug 96 at the upper front corner of body 72 has a transverse mounting hole 98 therethrough. In the lower forward central portion of body 72, a locking hole 100 extends transversely therethrough.

Figure 11:
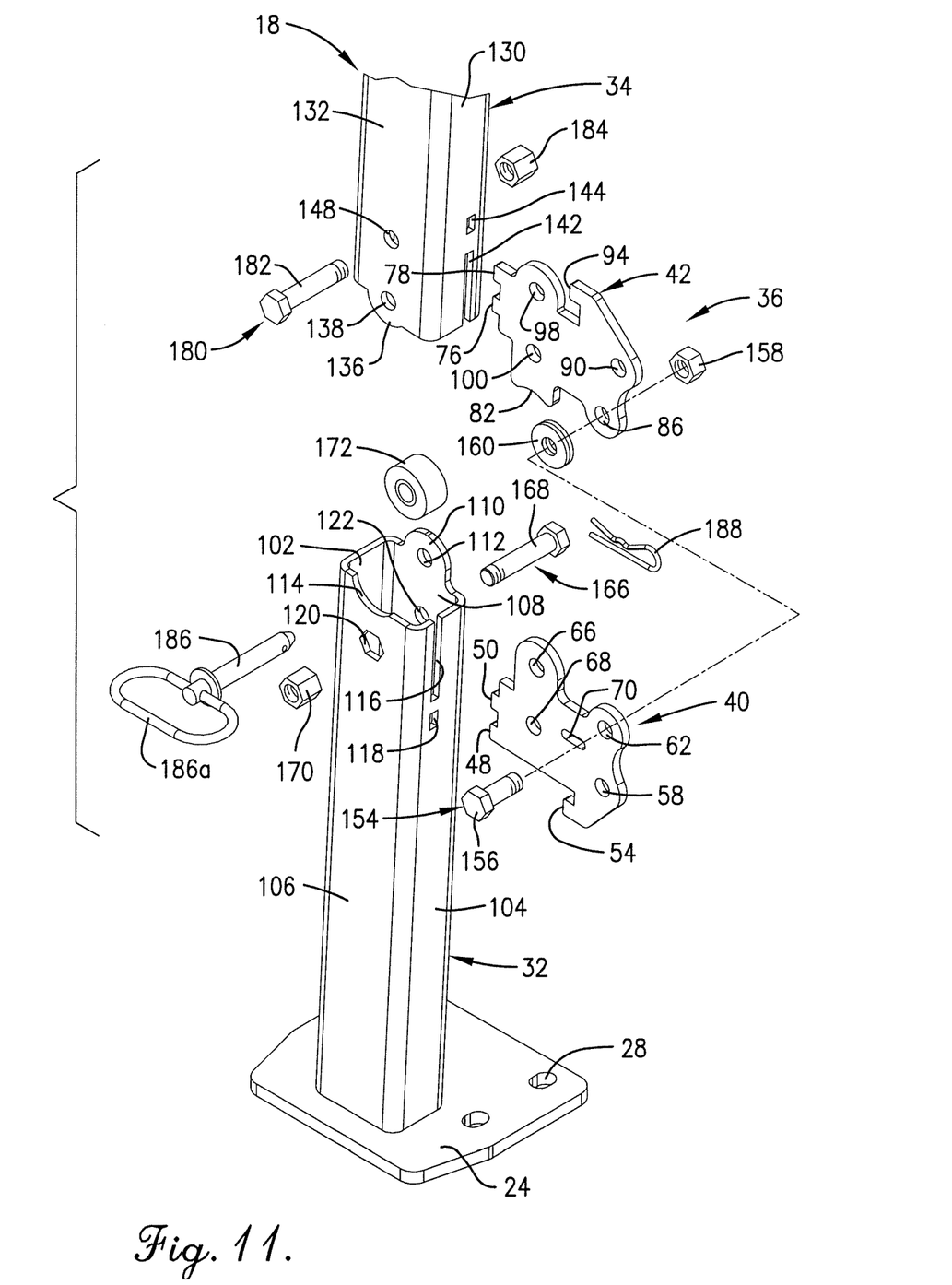
FIG. 11 is a fragmentary, exploded, left rear isometric view of the left leg of the roll-over structure and hinge assembly.
Figure 12:
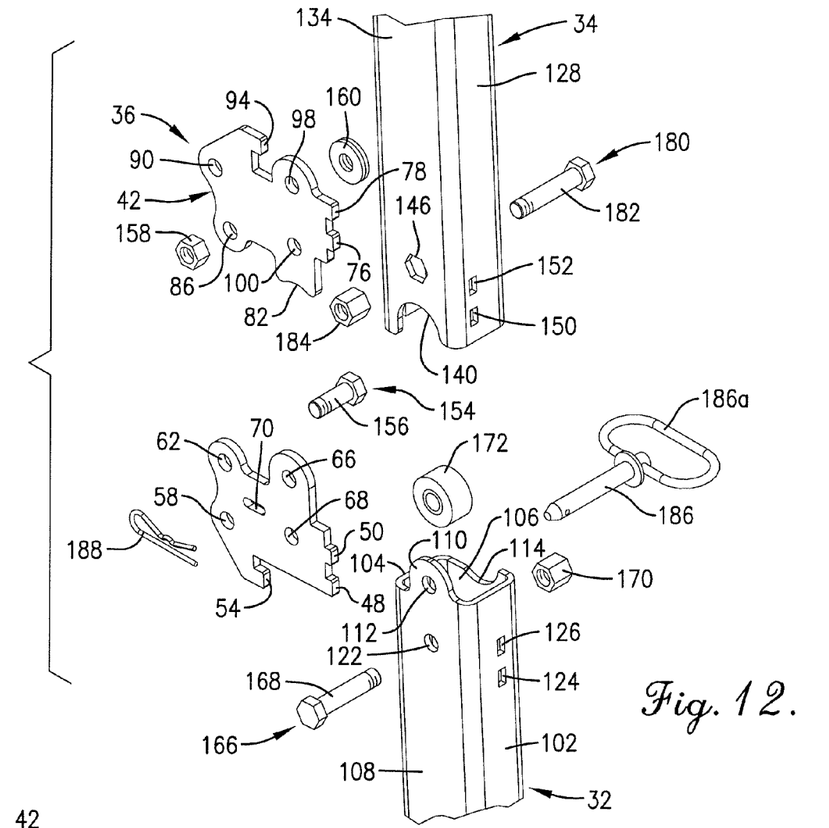
FIG. 12 is a fragmentary, exploded isometric view of the left leg of the roll-over structure looking in the opposite direction from that of FIG. 11.

Each lower leg portion 32 comprises a front wall 102, a rear wall 104 parallel to and spaced rearwardly from front wall 102, an outer side wall 106, and an inner side wall 108 spaced inwardly from outer sidewall 106 and extending parallel thereto. In the illustrated embodiment, the sidewalls 106 and 108 are wider than the front and rear walls 102, 104, although this could obviously vary as mentioned earlier.

The upper edge of inner sidewall 108 is configured to present an upwardly projecting, rounded lug 110 having a transverse locking hole 112 therethrough. The opposite upper edge of outer sidewall 106 is dished out to present an arcuate recess 114.

Rear wall 104 has a vertical slot 116 therein leading up to the upper edge of rear wall 104 such that slot 116 is open at its upper end. Slot 116 is slightly wider than body 44 of lower hinge plate 40. A rectangular locating hole 118 is disposed in rear wall 104 a short distance below the bottom of slot 116.

Outer sidewall 106 of lower leg portion 32 is provided with a hexagonal retaining hole 120. Although other shapes with flat sides could be used, the hexagonal configuration is preferred so as to complementally receive a locking nut as hereinafter explained in further detail. Opposite the hexagonal hole 120 is a circular bolt hole 122 in inner sidewall 108. Front wall 102 has a pair of vertically spaced, rectangular locating holes 124 and 126 therein disposed in the same vertical plane as slot 116 and locating hole 118 in rear wall 104.

Each upper leg portion 34 includes a front wall 128, a rear wall 130 spaced rearwardly from front wall 128 and extending parallel thereto, an outer sidewall 132, and an inner sidewall 134 spaced laterally from and parallel to outer sidewall 132. Outer sidewall 132 is provided with a curved lug 136 that is configured complementally of recess 114 in outer sidewall 106 of lower leg portion 32. A locking hole 138 is provided in lug 136. The lower edge of inner sidewall 134, on the other hand, is provided with an arcuate recess 140 configured complementally to the lug 110 on the upper edge of inner sidewall 108 of lower leg portion 32.

Rear wall 130 of upper leg portion 34 is provided with a longitudinally extending slot 142 leading to the lower edge of rear wall 130. Slot 142 is thus open at its normally lower end and is slightly wider than the thickness of the body 72 of upper hinge plate 42. A rectangular locating hole 144 is disposed in rear wall 130 a short distance above slot 142.

Inner sidewall 134 is provided with a hexagonal retaining hole 146 above recess 140. The opposite outer sidewall 132 is provided with a bolt hole 148 that is transversely aligned with retaining hole 146. Adjacent its lower extremity, front wall 128 is provided with a pair of rectangular locating holes 150 and 152 disposed within the same vertical plane as slot 142 and locating hole 144 in rear wall 130.

Each hinge assembly 36, 38 has its plates 40, 42 pivotally interconnected by a coupling in the form of pivot bolt assembly 154 that defines the axis of relative pivoting movement between plates 40, 42. As illustrated with respect to hinge assembly 36 in the figures, pivot bolt assembly 154 includes a bolt 156, a nut 158 threaded onto the end of bolt 156, and an anti-friction washer 160 preferably constructed of ultra-high molecular weight polyurethane. Washer 160 is sandwiched between hinge plates 40 and 42 in alignment with bolt holes 62 and 90, and bolt 56 passes through holes 62, washer 160 and hole 90. Nut 158 is used to snug the two hinge plates 40, 42 tightly against opposite sides of washer 160. As is apparent, hinge assemblies 36 and 38 are assembled as mirror images of one another with the lower hinge plate 40 always being disposed to the outside and the upper hinge plates 42 always being disposed to the inside.

Figure 9:
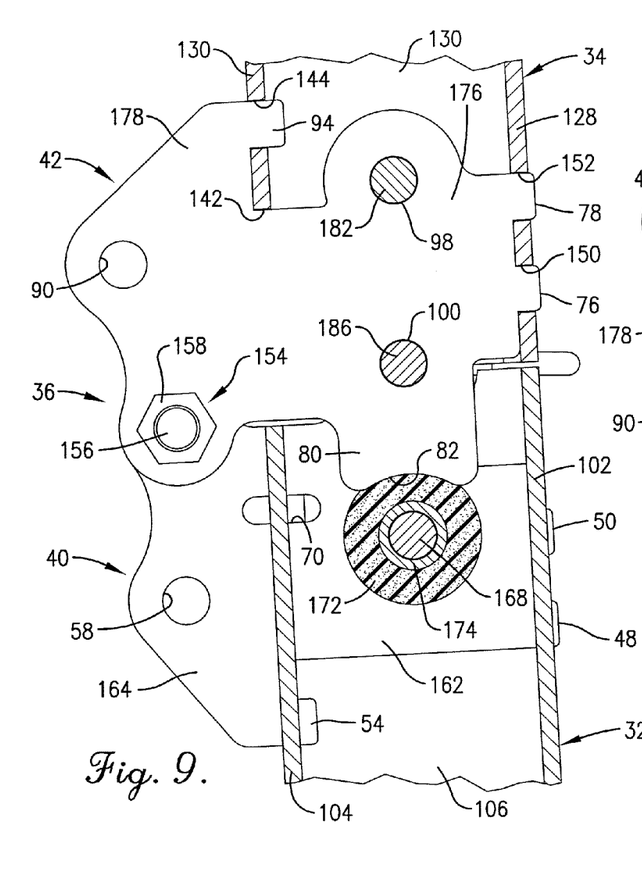
FIG. 9 is a fragmentary vertical cross-sectional view of the hinge assembly of FIG. 8 taken substantially along line 9-9 of FIG. 8, with the roll-over structure locked in its use position.
Figure 10:
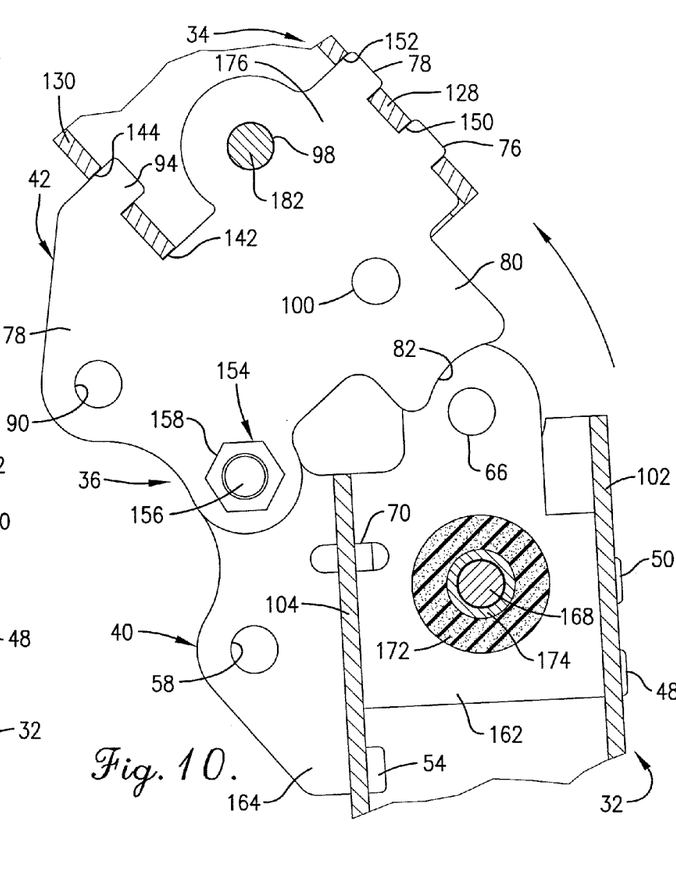
FIG. 10 is a fragmentary vertical cross-sectional view of the hinge assembly similar to FIG. 9 but showing the hinge assembly unlocked and the upper portion of the roll-over structure swung partly away from its use position to reveal details of construction.

Using the hinge assembly 36 as an example for both assemblies 36, 38, it will be seen that lower hinge plate 40, when installed within lower leg portion 32, is disposed in an upright orientation with its planar body 44 parallel to sidewalls 106 and 108 and perpendicular to front and rear walls 102, 104. Lower hinge plate 40 spans the tubular lower leg portion 104 in a fore-and-aft direction with the front locating tabs 48 and 50 received snugly within front locating holes 124 and 126 in front wall 102. The body 44 of hinge plate 40 passes through clearance slot 116 in rear wall 104, and rear tab 54 is received within locating hole 118 in rear wall 104. Thus, as illustrated in FIGS. 9 and 10 for example, lower hinge plate 40 has what could be termed an inside section 162 disposed within the interior of lower leg portion 32 and an outside section 164 disposed rearwardly outside of lower leg portion 32. Thus, pivot bolt assembly 154 passes through outside section 164, and locking hole 58 is similarly disposed in outside section 164.

In order to retain lower hinge plate 40 in place within lower leg portion 32, a suitable fastener is provided. In one preferred embodiment of the invention, such fastener may take the form of a bolt assembly 166, although other fasteners may also be suitable. Bolt assembly 166 includes a bolt 168 passing through bolt hole 122 in inner sidewall 108, mounting hole 68 in lower hinge plate 40, and hexagonal retaining hole 120 in outer sidewall 106. In addition, bolt assembly 166 includes a hex nut 170 that is complementally received within hexagonal retaining hole 120 and into which the end of bolt 168 is threaded. Hexagonal retaining hole 120 thus prevents hex nut 170 from rotating when bolt 168 is rotated for installation or disassembly purposes. As illustrated in FIGS. 9 and 10, bolt 168 passes through the inside section 162 of lower hinge plate 40.

Mounted on bolt 168 between lower hinge plate 40 and inner sidewall 108 is a resiliently compressible cushion in the nature of a cylinder 172. Cushion cylinder 172 has an internal bushing 174 that receives the shank of bolt 168.

Upper hinge plate 42 is disposed in an upright condition and spans the upper leg portion 34 in a fore-and-aft direction so that the plane of its body 72 is parallel with opposite sidewalls 132, 134 and perpendicular to front and rear walls 128, 130. Front tabs 76, 78 are received within front locating holes 150, 152 respectively, while rear tab 94 is received within rear locating hole 144. The body 72 of upper hinge plate 42 passes through slot 142 in rear wall 130. In its installed position, upper hinge plate 42 thus presents an inside section 176 disposed within upper leg portion 34 as seen, for example, in FIGS. 9 and 10, and an outside section 178 disposed rearwardly outside of upper leg portion 34 as illustrated in those same figures. Thus, pivot bolt assembly 154 is disposed within outside section 178, as is locking hole 90. On the other hand, locking hole 100 and mounting hole 98 are located within inside section 176.

In order to retain upper hinge plate 42 in place and to fasten it to upper leg portion 34, a variety of different methods could be used. Preferably, a mechanical fastener is utilized, and in a most preferred embodiment, such fastener takes the form of a bolt assembly 180 similar in construction and function to the mounting bolt assembly 154 associated with lower hinge plate 40. Preferably, bolt assembly 180 includes a bolt 182 passing through hole 148 in inner sidewall 132, hole 98 in upper plate 42, and hexagonal retaining hole 46 in inner sidewall 134 of upper leg portion 34. Bolt assembly 180 further includes a hex nut 184 that is complementally received within retaining hole 146 and which threadably receives the end of bolt 182. The hexagonal shape of hole 146 prevents hex nut 184 from rotating when bolt 182 is being tightened or loosened.

Figure 8:
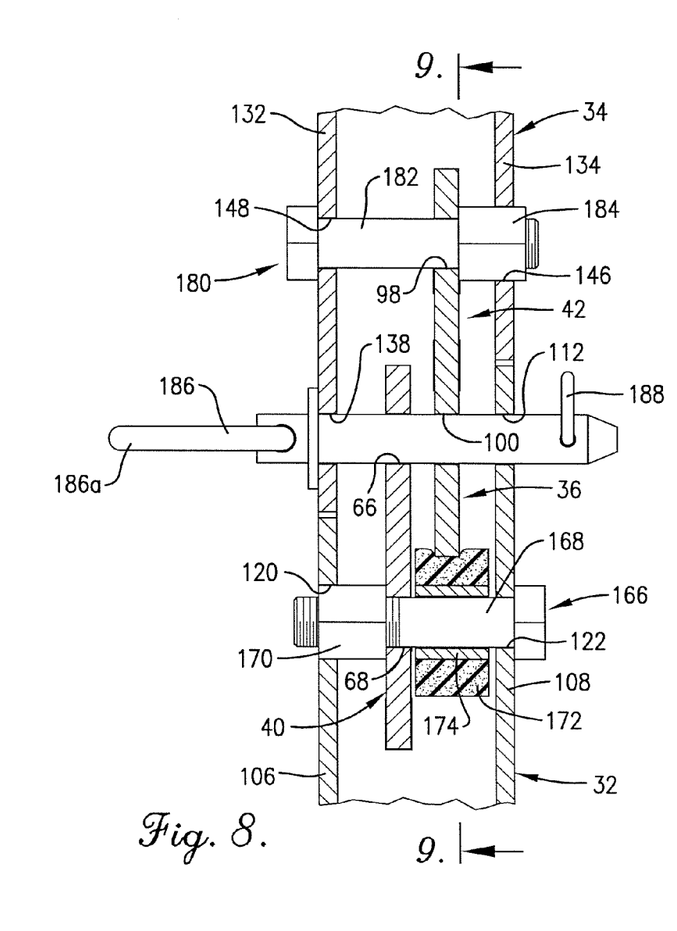
FIG. 8 is a fragmentary enlarged vertical cross-sectional view through one of the hinge assemblies of the roll-over structure taken substantially along line 8-8 of FIG. 5.

Structure 10 may be selectively, releasably locked in either its upright, use position of FIG. 3 or its folded position of FIG. 4. A pair of locking pins 186, one for each hinge assembly 36, 38, are provided for accomplishing such locking action. When structure 10 is in its use position of FIG. 3, the feet 80 of the upper hinge plates 42 engage the cushion cylinders 172 as illustrated in FIGS. 8 and 9. By pivoting the upper part of structure 10 sufficiently forwardly as to bring locking holes 66 and 100 of each hinge assembly 36, 38 into alignment with one another, the cushion cylinders 172 will be slightly depressed by the seats 82 of feet 80. In this condition, lock pins 186 may be inserted through locking hole 138 in each upper leg portion 34, aligned locking holes 66, 100 in hinge plates 40, 42 respectively, and locking hole 112 in lower leg portion 32.

In one preferred embodiment, a cotter pin may be inserted transversely into the exposed end of each lock pin 186 for preventing accidental withdraw of the lock pin 186 through vibration or otherwise. Although not illustrated herein, it is to be understood that a lanyard could be connected between the loop 186a of each lock pin 186 and the cotter pin 188 to avoid misplacing cotter pin 188 when pin 186 is withdrawn. Conveniently, such lanyard may be threaded through the elongated clearance hole 70 in lower hinge plate 40.

Figure 7:
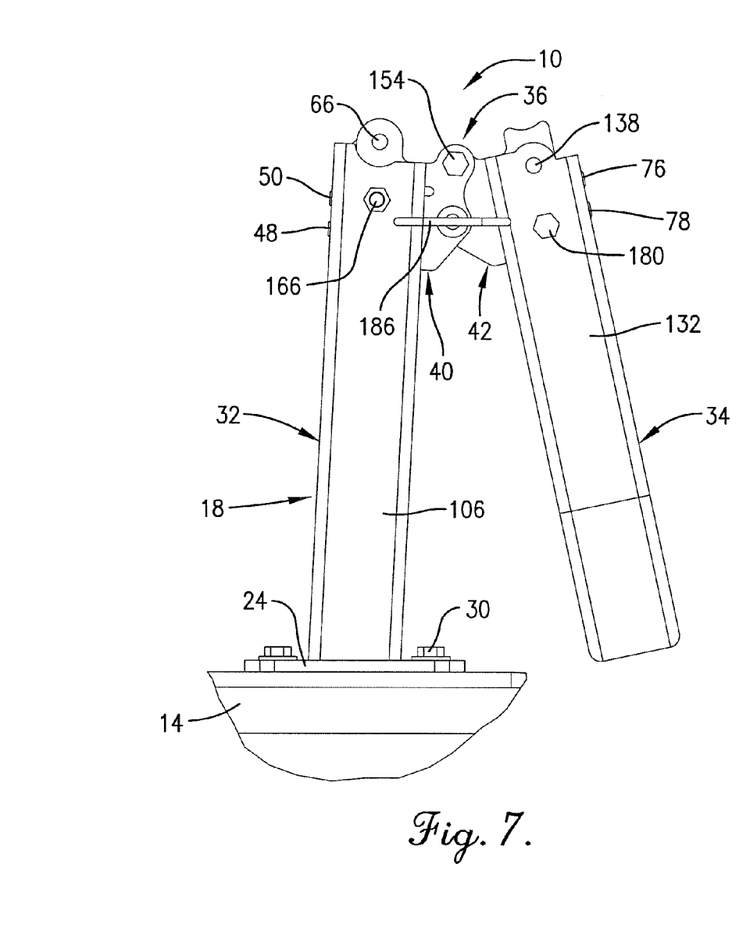
FIG. 7 is a fragmentary left side elevational view of the roll-over structure similar to FIG. 5 but showing the structure locked in its folded position.

Likewise, the upper part of structure 10 may be locked in its folded position of FIGS. 4 and 7 when lock pins 86 have been removed from legs 18 and 20 of structure 10. With the upper half of structure 10 folded fully down as illustrated in FIGS. 4 and 7, locking holes 58 and 90 in hinge plates 40, 42 may be brought into alignment with one another, permitting lock pins 186 to be inserted and the cotter pins 188 replaced.

Operation

During normal use, the protective roll-over structure 10 is disposed in its fully unfolded, use position of FIG. 1. Locking pins 186 retain the upper half of structure 10 sturdily locked in such upright position. Inasmuch as the cushions 172 are compressed by upper hinge plates 42 at this time, noisy rattling of the various components of the hinge assemblies is minimized. The resilient, resistive force exerted by cushions 172 on upper hinge plates 42 is transmitted throughout the inter-engaging components of the hinge assemblies to take up slack in the system so that movement relative to one another and consequential rattling is held to a minimum. Although cushions 172 are not a required feature for the hinge assemblies 36 and 38 to perform satisfactorily, in a most preferred embodiment, they are certainly beneficial and desirable.

In the event that structure 10 is desired to be collapsed into its folded position of FIG. 2, it is first necessary to withdraw the two cotter pins 188 from their locking pins 186. Thereupon, locking pins 186 may be pulled out of their locking holes to free up hinges 36 and 38 for folding. When the upper half of structure 10 is folded down to its FIG. 2 position, it may be left hanging in that condition if desired, with the locking pins 186 and cotter pins 188 either stored or a suitable receptacle or left hanging from hinge assemblies 36, 38 by lanyards or other devices as mentioned above. On the other hand, the operator may prefer to lock structure 10 in its folded position, in which event locking holes 58, 90 of hinge plates 40, 42 are brought into mutual alignment to allow the insertion of locking pins 186, followed by cotter pins 188.

It will be appreciated from the foregoing that the special hinge assemblies 36, 38, and the way they are mounted to the legs 18 and 20 of structure 10, provide a folding roll-over protective structure that is a marked improvement over the prior art in many significant ways. For example, although hinge assemblies 36 and 38 could be welded at various locations to legs 18 or 20, the present design permits hinge assemblies 36 and 38 to be installed and placed in use entirely weld-free if desired. This can be accomplished without comprising strength and structural integrity and can even provide a system that is stronger and more reliable than prior art arrangements. In addition, the aesthetics of the product are improved, yielding a neat, clean, compact appearance that is much improved over some prior crude constructions.

Moreover, the system is quiet, easy-to-use, and can be fabricated and assembled with reduced labor costs. Because of the particular arrangement of locking tabs and holes on the hinge assemblies and legs 18, 20, the hinge plates are virtually self-locating and it is very difficult to improperly install them during assembly of the product.

It will be appreciated that the various holes and contours in tubular legs 18 and 20 of structure 10 can be created in a number of ways using various types of equipment. One particularly satisfactory technique is to cut such shapes using a laser cutting system such as the MAZAK 3D FABRI-GEAR 150 TUBE LASER available from Mazak Optonics Corporation of Schaumburg, Ill.

The inventor(s) hereby state(s) his/their intent to rely on the Doctrine of Equivalents to determine and assess the reasonably fair scope of his/their invention as pertains to any apparatus not materially departing from but outside the literal scope of the invention as set out in the following claims.

The invention claimed is:

1. A folding roll-over protective structure comprising:
a pair of laterally spaced apart, tubular, upright legs,
each of said legs including a lower portion and an upper portion;
a transverse member interconnecting the upper portions of said legs; and
a hinge on each leg permitting the structure to fold between a use position and a folded position,
at least one of said hinges comprising an upright lower hinge plate on the lower portion of a leg and an upright upper hinge plate on the upper portion of a leg,
at least one of said hinge plates having a front inner section spanning the leg respective portion inside the same and being supported by opposite front and rear wall portions of the respective leg portion,
said at least one hinge plate further having a rear outer section disposed outside of the respective leg portion behind the rear wall portion and pivotally connected to the other hinge plate.

2. A folding roll-over protective structure as claimed in claim 1,
said inner section of said at least one hinge plate having a fastener passing transversely therethrough and fastening the at least one hinge plate to its leg portion.

3. A folding roll-over protective structure as claimed in claim 2,
said fastener comprising a bolt.

4. A folding roll-over protective structure as claimed in claim 1,
said legs being generally rectangular in transverse cross-section.

5. A folding roll-over protective structure comprising:
a pair of laterally spaced apart, tubular, upright legs,
each of said legs including a lower portion and an upper portion;
a transverse member interconnecting the upper portions of said legs; and
a hinge on each leg permitting the structure to fold between a use position and a folded position,
at least one of said hinges comprising an upright lower hinge plate on the lower portion of a leg and an upright upper hinge plate on the upper portion of a leg,
at least one of said hinge plates having an inner section spanning the leg portion inside the same and being supported by opposite wall portions of the leg portion,
said at least one hinge plate further having an outer section disposed outside of the leg portion and pivotally connected to the other hinge plate,
said inner section having at least one projection received within a hole in one of said wall portions,
said outer section having at least one projection received within a hole in the opposite wall portion.

6. A folding roll-over protective structure as claimed in claim 5,
said opposite wall portion having a slot spaced from said hole therein and communicating with an open end of the leg portion,
said slot receiving said at least one hinge plate.

7. A folding roll-over protective structure as claimed in claim 6,
said at least one hinge plate being bolted to its leg portion.

8. A folding roll-over protective structure comprising:
a pair of laterally spaced apart, tubular, upright legs,
each of said legs including a lower portion and an upper portion;
a transverse member interconnecting the upper portions of said legs; and
a hinge on each leg permitting the structure to fold between a use position and a folded position,
at least one of said hinges comprising an upright lower hinge plate on the lower portion of a leg and an upright upper hinge plate on the upper portion of a leg,
at least one of said hinge plates having an inner section spanning the leg portion inside the same and being supported by opposite wall portions of the leg portion,
said at least one hinge plate further having an outer section disposed outside of the leg portion and pivotally connected to the other hinge plate,
said inner section of said at least one hinge plate having a locking hole disposed to be mutually aligned with a locking hole in the other hinge plate of said at least one hinge and with corresponding locking holes in the upper and lower leg portions to which the at least one hinge is attached when the structure is in the use position, whereby to permit locking of the structure in the use position by a locking member received within the aligned locking holes of the leg portions and the hinge plates.

9. A folding roll-over protective structure as claimed in claim 8,
further comprising a resilient cushion disposed within the leg portion associated with said at least one hinge plate,
said cushion being positioned for compressive engagement by the other hinge plate when the structure is locked in said use position.

10. A folding roll-over protective structure as claimed in claim 9,
said inner section of said at least one hinge plate having a fastener passing transversely therethrough and fastening the at least one hinge plate to its leg portion,
said cushion being disposed on said fastener.

11. In combination with a motorized riding vehicle, a folding roll-over protective structure mounted on said vehicle and comprising:
a pair of laterally spaced apart, tubular, upright legs, each of said legs including a lower portion and an upper portion;

a transverse member interconnecting the upper portions of said legs; and a hinge on each leg permitting the structure to fold between a use position and a folded position, at least one of said hinges comprising an upright lower hinge plate on the lower portion of a leg and an upright upper hinge plate on the upper portion of a leg, at least one of said hinge plates having a front inner section spanning the leg portion inside the same and being supported by opposite front and rear wall portions of the leg portion, said at least one hinge plate further having a rear outer section disposed outside of the leg portion behind the rear wall portion and pivotally connected to the other hinge plate.

12. The combination as claimed in claim 11,
said inner section of said at least one hinge plate having a fastener passing transversely therethrough and fastening the at least one hinge plate to its leg portion.

13. The combination as claimed in claim 12,
said fastener comprising a bolt.

14. The combination as claimed in claim 11,
said legs being generally rectangular in transverse cross-section.

15. In combination with a motorized riding vehicle, a folding roll-over protective structure mounted on said vehicle and comprising:

a pair of laterally spaced apart, tubular, upright legs, each of said legs including a lower portion and an upper portion;

a transverse member interconnecting the upper portions of said legs; and a hinge on each leg permitting the structure to fold between a use position and a folded position, at least one of said hinges comprising an upright lower hinge plate on the lower portion of a leg and an upright upper hinge plate on the upper portion of a leg, at least one of said hinge plates having an inner section spanning the leg portion inside the same and being supported by opposite wall portions of the leg portion, said at least one hinge plate further having an outer section disposed outside of the leg portion and pivotally connected to the other hinge plate, said inner section having at least one projection received within a hole in one of said wall portions, said outer section having at least one projection received within a hole in the opposite wall portion.

16. The combination as claimed in claim 15,
said opposite wall portion having a slot spaced from said hole therein and communicating with an open end of the leg portion,
said slot receiving said at least one hinge plate.

17. The combination as claimed in claim 16,
said at least one hinge plate being bolted to its leg portion.

18. In combination with a motorized riding vehicle, a folding roll-over protective structure mounted on said vehicle and comprising:

a pair of laterally spaced apart, tubular, upright legs, each of said legs including a lower portion and an upper portion;

a transverse member interconnecting the upper portions of said legs; and a hinge on each leg permitting the structure to fold between a use position and a folded position, at least one of said hinges comprising an upright lower hinge plate on the lower portion of a leg and an upright upper hinge plate on the upper portion of a leg, at least one of said hinge plates having an inner section spanning the leg portion inside the same and being supported by opposite wall portions of the leg portion, said at least one hinge plate further having an outer section disposed outside of the leg portion and pivotally connected to the other hinge plate, said inner section of said at least one hinge plate having a locking hole disposed to be mutually aligned with a locking hole in the other hinge plate of said at least one hinge and with corresponding locking holes in the upper and lower leg portions to which the at least one hinge is attached when the structure is in the use position, whereby to permit locking of the structure in the use position by a locking member received within the aligned locking holes of the leg portions and the hinge plates.

19. The combination as claimed in claim 18,
further comprising a resilient cushion disposed within the leg portion associated with said at least one hinge plate,
said cushion being positioned for compressive engagement by the other hinge plate when the structure is locked in said use position.

20. The combination as claimed in claim 19,
said inner section of said at least one hinge plate having a fastener passing transversely therethrough and fastening the at least one hinge plate to its leg portion,
said cushion being disposed on said fastener.

21. A folding roll-over protective structure comprising:
a pair of laterally spaced apart, upright legs;
a transverse member interconnecting upper ends of said legs; and
a hinge on each leg permitting the structure to fold between a use position and a folded position,
at least one of said hinges comprising a lower hinge plate on a lower portion of a leg and an upper hinge plate on an upper portion of a leg,
at least one of said hinge plates being bolted to its leg portion,
each of said legs being tubular,
each of said leg portions having a pair of opposed front and rear walls,
said at least one hinge plate spanning said front and rear walls and being supported thereby,
said at least one hinge plate having a front inner section disposed inside of and bolted to the corresponding leg portion and a rear outer section disposed outside of the corresponding leg portion behind said rear wall and pivotally connected to the other hinge plate of the at least one hinge.

22. A folding roll-over protective structure comprising:
a pair of laterally spaced apart, upright legs;
a transverse member interconnecting upper ends of said legs; and
a hinge on each leg permitting the structure to fold between a use position and a folded position,
at least one of said hinges comprising a lower hinge plate on a lower portion of a leg and an upper hinge plate on an upper portion of a leg,
at least one of said hinge plates being bolted to its leg portion,
each of said legs being tubular,
said at least one hinge plate having an inner section disposed inside of and bolted to the corresponding leg portion and an outer section disposed outside of the corresponding leg portion and pivotally connected to the other hinge plate of the at least one hinge, each of said leg portions having a pair of opposed walls, said at least one hinge plate spanning said walls and being supported thereby, said inner section having at least one tab received within a hole in one of said walls, said outer section having at least one tab received within a hole in the opposite wall.

23. A folding roll-over protective structure as claimed in claim 22, said opposite wall having a slot therein spaced from said hole therein and communicating with an open end of the leg portion, said slot receiving said at least one hinge plate.

24. A folding roll-over protective structure as claimed in claim 23, said at least one hinge plate being bolted to its leg portion by a bolt passing through a pair of opposed sidewalls of the leg portion and through the inner section of the at least one hinge plate in a direction generally parallel to the axis about which said hinge plates are pivotally interconnected.

25. A folding roll-over protective structure as claimed in claim 24, said inner section of said at least one hinge plate having a locking hole disposed to be mutually aligned with a locking hole in the other hinge plate of said at least one hinge and with corresponding locking holes in the upper and lower leg portions to which the at least one hinge is attached when the structure is in the use position, whereby to permit locking of the structure in the use position by a locking member received within the aligned locking holes of the leg portions and the hinge plates.

26. A folding roll-over protective structure as claimed in claim 25, said outer section of said at least one hinge plate having a second locking hole disposed to be aligned with a corresponding second locking hole in the other hinge plate of said at least one hinge when the structure is in the folded position, whereby to permit locking of the structure in the folded position by a locking member received with the aligned second locking holes of the hinge plates.

27. A folding roll-over protective structure as claimed in claim 25, said bolt of the at least one hinge plate having a resilient cushion thereon disposed to be compressively engaged by the other hinge plate when the structure is locked in said use position.

28. A hinge assembly adapted for attachment to upper and lower tubular leg portions of a roll-over protective structure to render the structure capable of being folded between a use position and a folded position, said hinge assembly comprising:

a lower hinge plate for the lower leg portion;

an upper hinge plate for the upper leg portion; and a coupling pivotally interconnecting said plates for relative pivoting movement about an axis transverse to the planes of the plates, each of said plates comprising a flat body having an outer peripheral edge, said edge being configured to present at least one forwardly projecting front projection disposed for reception within a front locating hole in a forward wall portion of a tubular leg portion and at least one forwardly projecting rear projection disposed for reception within a rear locating hole in a rear wall portion of the tubular leg portion.

29. A hinge assembly as claimed in claim 28, further comprising a fastener extending transversely through the body of each of said hinge plates for attaching the hinge plate to its leg portion.

30. A hinge assembly as claimed in claim 29, said fastener comprising a bolt.

31. A hinge assembly as claimed in claim 30, the fastener of one of said hinge plates having a resilient cushion thereon, the edge of the body of the other hinge plate including a stretch disposed to compressively engage the cushion when the hinge plates are in said use position.

32. A hinge assembly as claimed in claim 31, said one hinge plate comprising the lower hinge plate.

33. A hinge assembly as claimed in claim 29, the body of each hinge plate having an hole therein disposed to be aligned with a corresponding hole in the other hinge plate when the hinge plates are in a use position, further comprising a locking member removably receivable within said holes when the hinge plates are in said use position for releasably locking the hinge plates in said use position.

34. A hinge assembly as claimed in claim 33, the body of each hinge plate having a second hole therein disposed for alignment with a corresponding second hole in the other hinge plate when the hinge plates are pivoted to a second position, said locking member being removably receivable within said second holes for releasably locking the hinge plates in said second position.

* * * * *